A. & H. C. HARVEY.
MACHINE FOR MANUFACTURING POMPONS.
APPLICATION FILED DEC. 17, 1912.
1,079,125.
Patented Nov. 18, 1913.
5 SHEETS—SHEET 1.
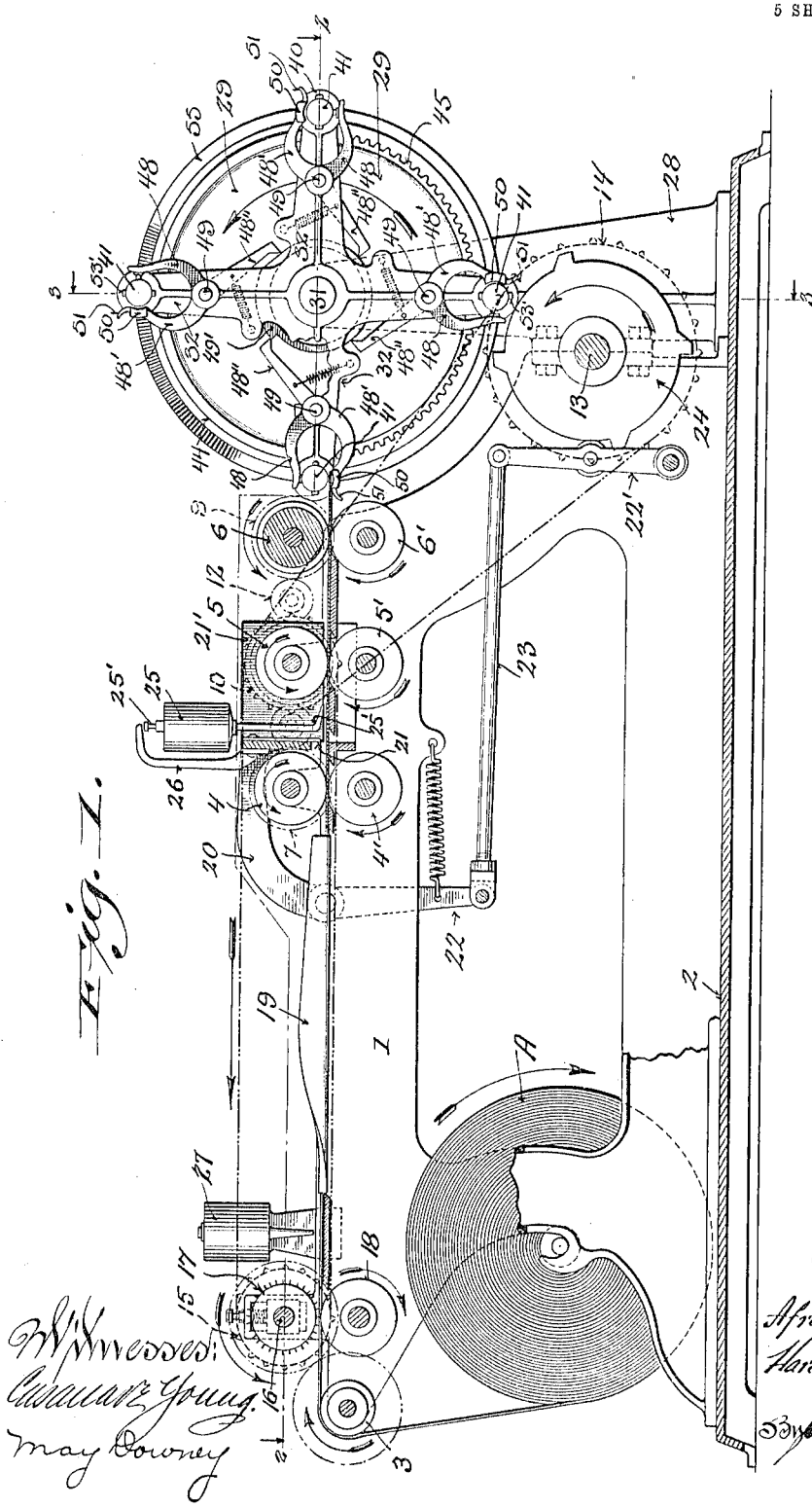

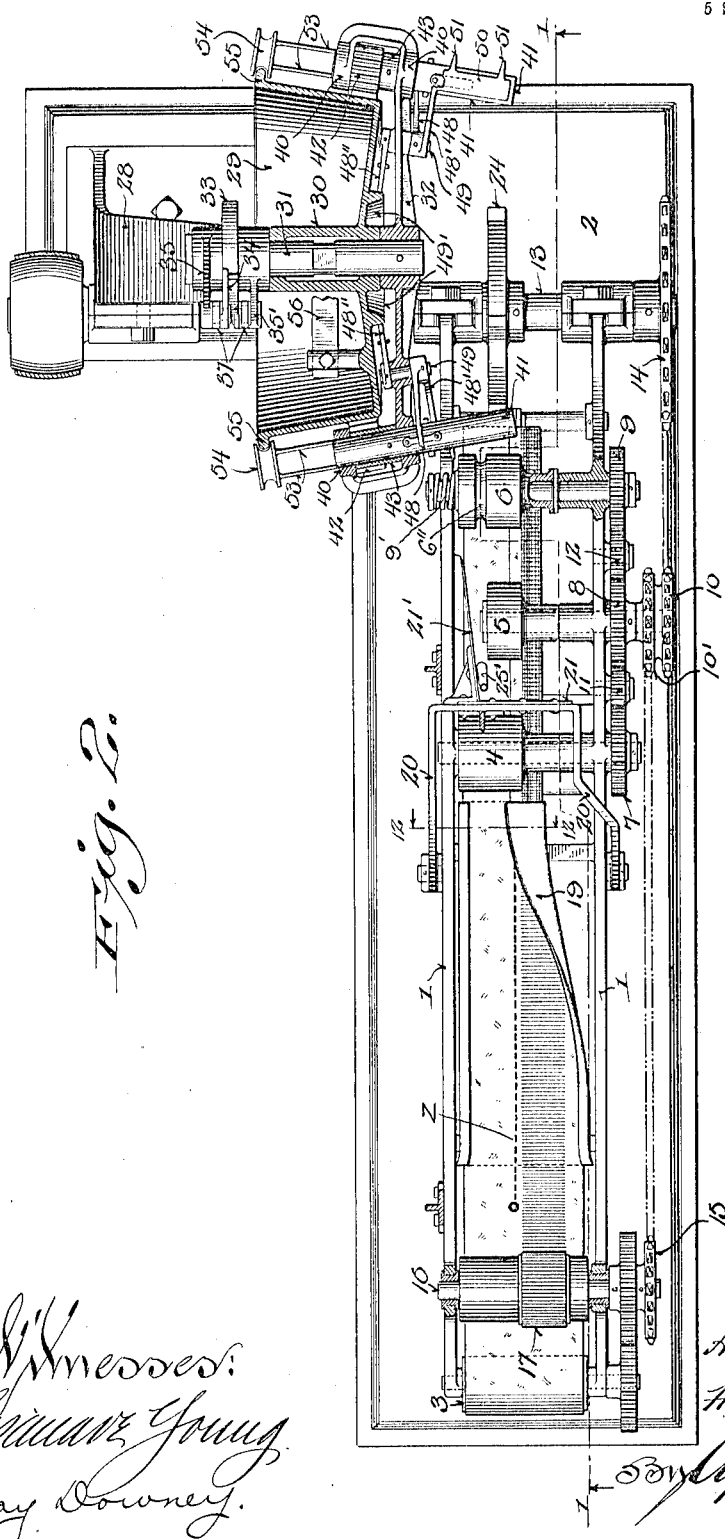

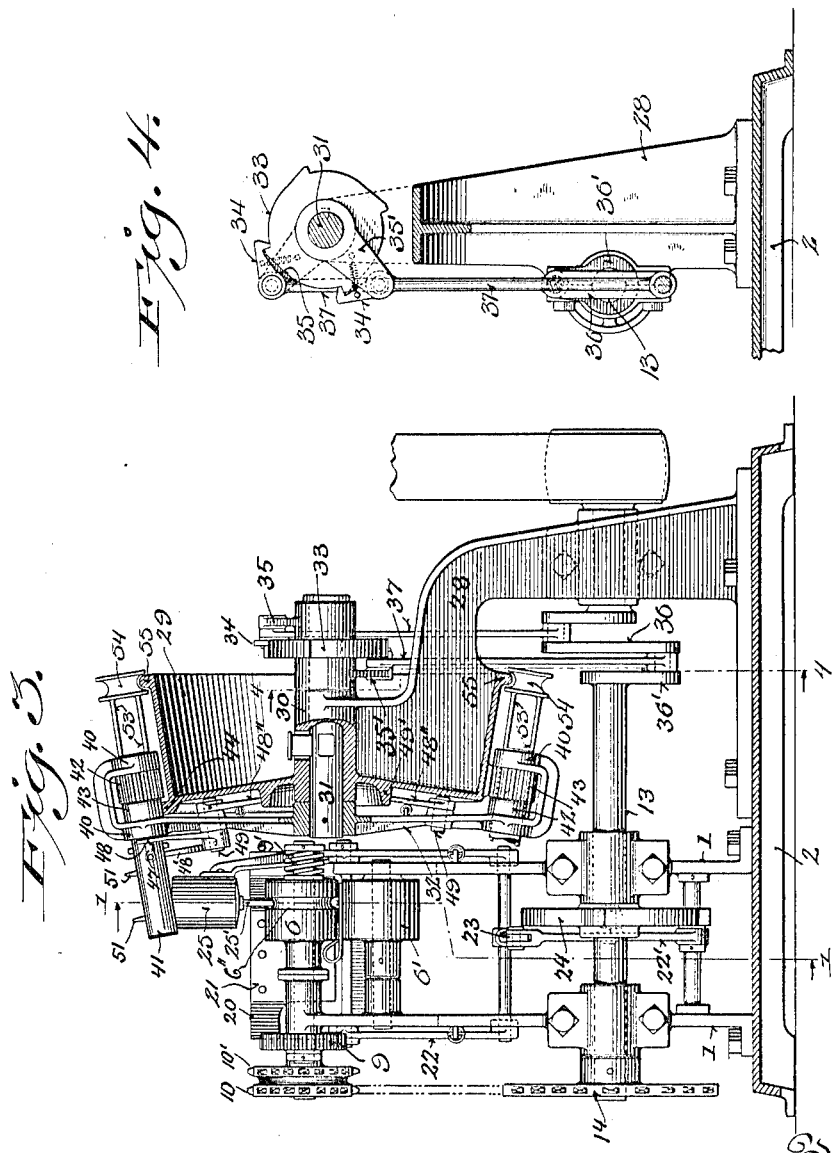

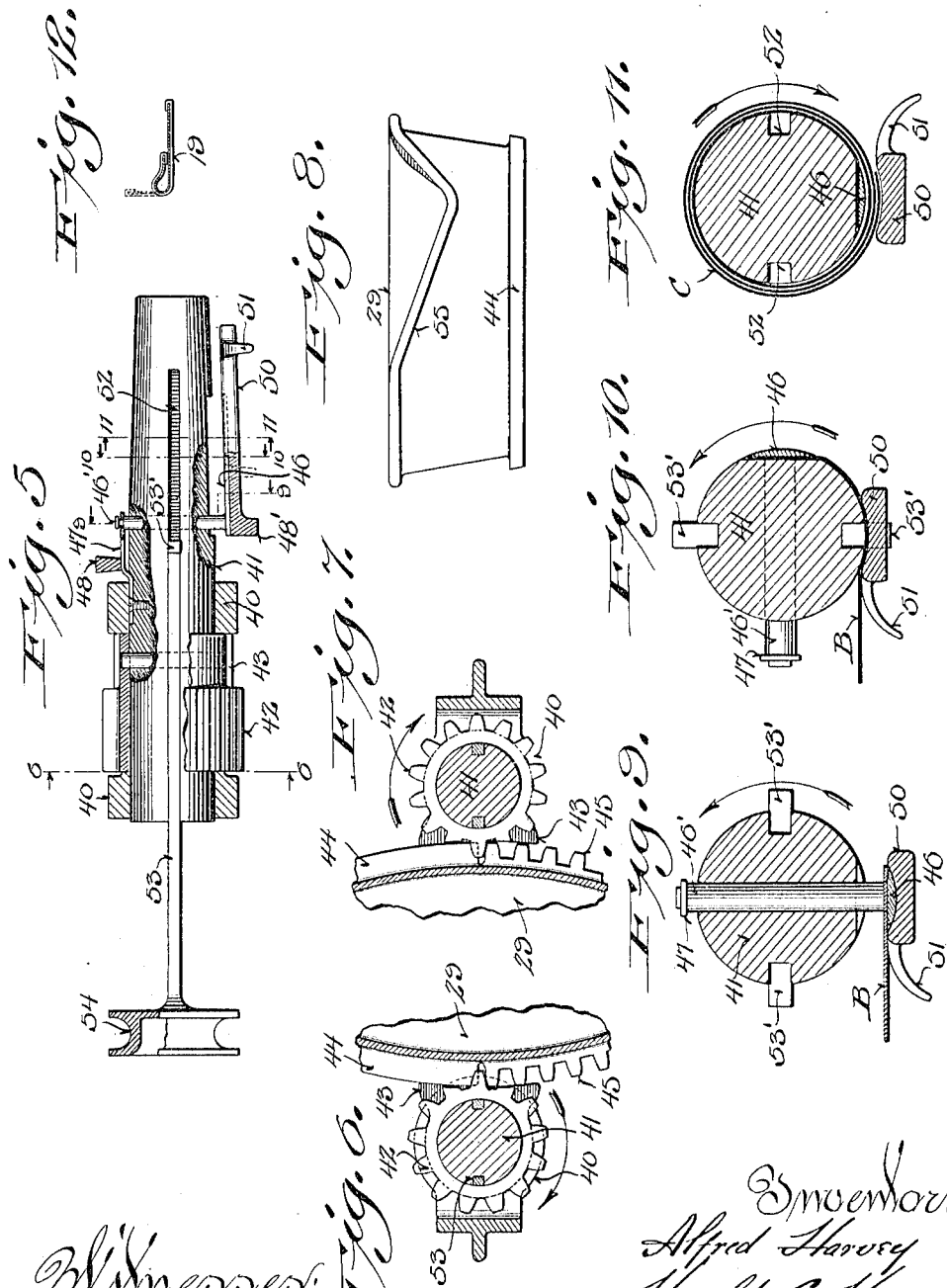

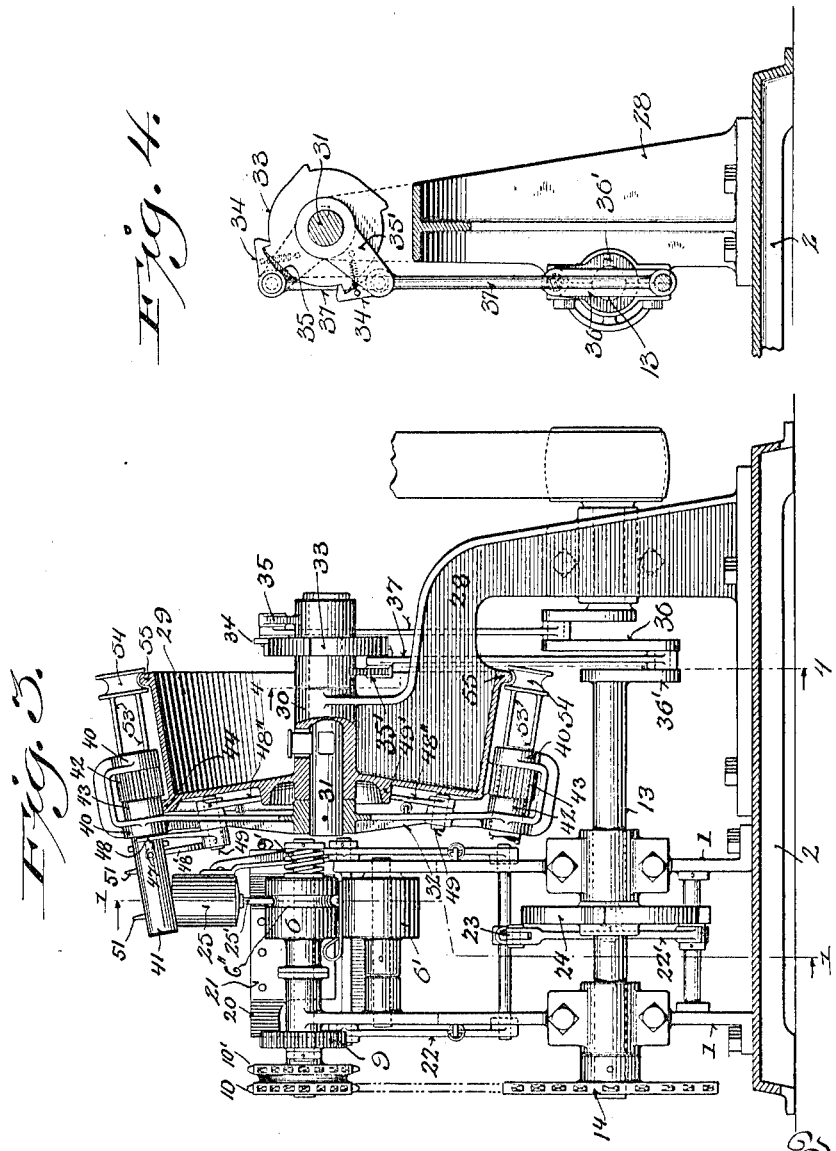

UNITED STATES PATENT OFFICE.

ALFRED HARVEY AND HAROLD C. HARVEY, OF MILWAUKEE, WISCONSIN.

MACHINE FOR MANUFACTURING POMPONS.

1,079,125.   Specification of Letters Patent.   Patented Nov. 18, 1913.

Application filed December 17, 1912. Serial No. 737,261.

*To all whom it may concern:*

Be it known that we, ALFRED HARVEY and HAROLD C. HARVEY, both citizens of the United States, and residents of Milwaukee, in the county of Milwaukee and State of Wisconsin, have invented certain new and useful Improvements in Machines for Manufacturing Pompons; and we do hereby declare that the following is a full, clear, and exact description thereof.

The primary object of our invention is to provide a machine for forming pompons or like articles, the same embodying a mandrel about which blanks or strips of material are spirally wound, the last winding being secured.

This invention is particularly applicable to forming paper culinary ornaments, the said ornaments having tubular shanks that are adapted to be fitted over the exposed bone portion of a fowl, chop or other portion of meat, it being understood that the ornaments may be used for any purpose other than that specified.

Specific objects of our invention are to provide means for automatically feeding a strip of material, preferably paper, from a roll to a forming mandrel and by interposing means, successively fringing the strip adjacent to one edge by slitting, folding and securing the fringed edge, cutting sections of the fringed edge strip into blanks and thereafter causing said blanks to be wound about the mandrel to form an ornament, having a tubular shank, the last coil of which shank is confined, and to provide means for stripping the finished article from the mandrel; to provide means coöperative with the mandrel for gripping the forward end of the blank prior to a spiral winding operation of the latter; to provide means for tensioning the coils of the blank during a winding operation; to provide a shiftable head carrying a series of mandrels that are individually alined with a feeding point, whereby the blanks are successively formed into pompons to thus increase the capacity of the machine relative to its speed, and to provide means for holding the finished pompons a predetermined interval of time, whereby the securing means for the last coil will permanently set.

With the above and other objects in view the invention consists in certain peculiarities of construction and combination of parts as set forth hereinafter with reference to the accompanying drawings and subsequently claimed.

In the drawings Figure 1 represents a longitudinal sectional elevation of a machine embodying the features of our invention, the section being indicated by line 1—1 of Fig. 2; Fig. 2, a plan view of the same with parts broken away to more clearly illustrate structural features and with parts in section as indicated by line 2—2 of Fig. 1; Fig. 3, a transverse section of the machine, the section being indicated by line 3—3 of Fig. 1; Fig. 4, a detailed sectional elevation of a head-actuating mechanism, the section being indicated by line 4—4 of Fig. 3; Fig. 5, an enlarged detailed sectional view of a tube-forming mandrel with parts broken away and parts in full to more clearly illustrate structural features; Fig. 6, a cross-section of the same, the section being indicated by line 6—6 of Fig. 5, said section illustrating the driving means for the mandrel; Fig. 7, a similar cross-section of said mandrel showing the delay position that the mandrel assumes after a predetermined number of revolutions to form the pompon; Fig. 8, a detailed face view of the fixed mandrel-carrying head member illustrating a cam-track for controlling the stripping means carried by the mandrels; Figs. 9 and 10, other cross-sections of the mandrel, showing the same respectively in its starting position for forming the shank of the pompon tube and the position assumed after said mandrel has made one-quarter of a turn, the sections being indicated by lines 9—9, 10—10 respectively of Fig. 5; Fig. 11, a cross-section indicated by line 11—11 of Fig. 5, looking in the direction of the arrow showing the mandrel after a completed series of rotations with the shank of the pompon coiled thereabout in a drying position of rest prior to being stripped from said mandrel; Fig. 12, a cross-section of the blank edge-folding former upon a reduced scale, the section being indicated by line 12—12 of Fig. 2; Fig. 13, an enlarged inverted plan view of a portion of the mandrel showing its oblique position with relation to the blank incidental to a gripping engagement thereof with its forward end; Fig. 14, a similar top plan view of a portion of the mandrel showing a pompon coiled thereabout in a semi-completed state; Fig. 15, illustrates a plan view of one of the blanks flattened out, showing the lines of adhesive material and transverse gang slotted edge, and Fig. 16, an elevation of a completed pompon.

Referring by characters to the drawings, 1, 1, represent parallel standards of a frame, which standards are mounted upon a baseplate 2. Mounted between the standards at the feed end of the machine is a roll of paper A, the end of which passes upwardly and over a guide roller 3 and from thence it travels between sets of feed rollers 4, 4', 5, 5', and 6, 6'. The upper series 4, 5 and 6 of each set of feed-rollers have spindles which are suitably journaled in bearings with which the standards 1 are provided, the spindles carrying gear-wheels 7, 8 and 9 respectively. The spindle of the intermediate feed-roller 5 also carries a sprocket-wheel 10, whereby power is imparted to the series of feed rollers through pinions 11 and 12 that are respectively meshed with the gear-wheels 7 and 8 and 8 and 9.

Mounted in a suitable box with which the frame standard is provided at the discharge end is a crank-shaft 13 that receives its power from any suitable source. This crank-shaft carries a sprocket-wheel 14, which is in belt connection with the sprocket-wheel 10 of the feed-roller 5, the said sprocket-wheel being provided with a second toothed face 10' which is in link-belt connection with a similar sprocket-wheel 15, which sprocket-wheel is carried by a shaft 16 that is mounted in suitable bearings that extend from the standard 1 at the feed end of the machine. The shaft 16 carries a rotatory male cutting die 17, which cutting die operates in conjunction with an anvil roller 18, it being understood that the paper strip passes between said die members in its travel forward to the discharge feed rollers 6 and 6'. Interposed between the set of slitting or cutting die rollers 17 and 18 and the feed-rollers 4 and 4' is a strip-folding former-plate 19, the same being supported by the frame standards and, as shown in Fig. 12 of the drawings, this edge-folding former-plate at one side thereof is gradually turned up and over to form an open loop whereby the strip when caused to travel therethrough will be similarly folded upon itself.

Fulcrumed to the frame standards 1 is a yoke 20, which yoke carries a transversely disposed cutting blade 21, that is abutted by an obliquely arranged cutting blade 21', the said blades serving to sever the strip transversely into sections of predetermined dimensions. The knife yoke 20 has depending spring-controlled arms 22, which arms are connected by a pitman 23 to a cam-actuated lever 22', the same being fulcrumed upon a stud that extends from the adjacent frame-member 1. The lever 22' carries an antifriction roller for engagement with a cam-wheel 24, which cam-wheel is mounted upon the main crank-shaft 13, being provided in this instance with four projecting faces disposed at equal distances apart which successively actuate the cutting mechanism just described.

Mounted upon a bracket that extends from one of the standards 1 is a glue reservoir 25 having a reciprocative discharge nozzle 25' that extends therethrough, its lower end being normally disposed upon a slightly higher plane than that upon which the paper strip travels. This nozzle projects through the reservoir and is engaged by a finger 26, which finger is carried by the knife-yoke 20. Hence with each downward movement of the knife-yoke the nozzle is caused to move downwardly therewith and its foot portion will thus distribute a small quantity of adhesive material upon the paper co-incident to the latter being severed. This glue-reservoir mechanism forms no part of my invention, it being understood that any means for distributing glue at the desired point can be employed. Another glue-discharging reservoir 27 is supported by the frame between the intake mouth of the forming plate 19 and rotatory slitting dies 17 and 18, the same being arranged to supply a line of adhesive material to the paper strip thereunder, which line may be distributed by a constant stream or intermittent drops from the reservoir.

As best shown in Figs. 1 and 3 of the drawings, the rear end of the crank-shaft 13 is journaled in a bearing that is carried by a post 28. The foot portion of this post is secured to the base-plate 2 and its upper portion is merged into a fixed circular shell 29 having a central hub portion 30 in which is mounted an arbor 31. Secured to one end of the arbor is a spidered head 32, and secured to the opposite end of said arbor is a ratchet-wheel 33, movement being imparted thereto by a pair of spring-controlled pawls 34, 34, which are mounted upon arms 35, 35', the same being loosely journaled upon the spindle. These arms are connected to the oppositely extended crank-portions 36, 36' of the crank-shaft by links 37. As best shown in Figs. 2 and 3 of the drawings each spider arm of the head 32 is looped upon itself at its outer end to form alined journals 40 for a mandrel 41, the work-receiving end of each mandrel being extended obliquely toward the axis of the head about which axis they are adapted to rotate and in vertical alinement with the discharge feed-rollers 6, 6'.

Fitted between each pair of journals 40 of the head and secured to the mandrel 41 is a pinion 42 having a shoe extension 43, which shoe extension is adapted to slide upon a circular track 44 that extends approximately through one-half of the circumference of the shell. The opposite or lower half of the shell 29 is formed with a toothed semi-circular rack 45, which rack is adapted to engage and actuate the mandrel pinions, whereby they will make a predetermined number of revolutions during a semi-rotation of the head and thereafter when the said pinions travel past the last tooth of the rack as shown in Fig. 7, they will be locked against rotation due to the sliding engagement between the pinion shoe 43 and track section 44.

In the operation of the device each mandrel is arranged to be brought into alinement with the point of discharge between the feed-rollers 6 and 6′, there being a momentary delay in the rotation of the mandrel at this point due to the intermittent feed movement imparted to the head 32 through the crank-shaft and its connections with the pawl and ratchet mechanism carried by the head spindle 31. Each mandrel 41 carries a spring-controlled gripping finger 46, as best shown in Fig. 5, the said finger being formed with a stem 46′ which projects through a transverse aperture adjacent to the base of the work-receiving end of the mandrel. The stem of the gripping finger is connected to a spring lever 47, which, in turn, is secured to the body of the spindle. Normally the gripping finger is held seated in a flattened portion of the mandrel by the tension of spring 47 and the said finger is moved outwardly to form clearance between its mandrel seat by an arm 48 of a rocking lever. The rocking lever is rigidly secured to a spindle 49 which is journaled in the spider arm. A second arm 48′ of said rocking lever is extended outwardly to the opposite side of the spindle from that of its arm 48, the said arm 48′ serving as a support for a presser-foot 50, which presser-foot extends longitudinally of the working end of the mandrel and is provided with a seat into which the gripping finger rests when the latter is forced outwardly or opened. The presser-foot is also provided with flared tongues 51, which, in conjunction with the spindle form a bell-mouthed throat for guiding the forward end of a blank cut from the strip of paper A to the periphery of the mandrel. Hence when the mandrel assumes its momentary position of rest in alinement with the discharge point between the feed-rollers 6, 6′, the presser-foot together with the gripping jaw are opened to form a receiving mouth for the blank. The opening movement of the gripping finger and presser-foot is effected through engagement of a spring-controlled arm 48″ which is secured to the spindle 49 of the rocker arm, a nose of the arm 48″ being arranged to travel over the face of a fixed cam 49′ that projects from the adjacent face of the stationary shell 29. It will be observed that the presser-foot supporting arm and various connections with relation to the gripping finger are all disposed rearward of the working end of the mandrel so as to thus give the desired clearance for the travel of the paper blank about said working end.

After a blank is formed into a complete pompon it is desirable to strip the same from the mandrel end and for this purpose the mandrel is provided with a pair of oppositely disposed surface grooves 52 into which are fitted the legs 53 of a stripper member. The legs 53 are extended beyond the rear end of the mandrel, at which point they are connected by an annularly grooved cap 54 that engages a cam-track 55 which forms part of the shell 29. The forward ends of the stripper member legs 53 are provided with laterally extended feet 53′ which project beyond the face of the mandrel for engagement with the rear edge of the tubular shank of a finished pompon. Hence it is apparent that owing to the contour of the cam-flange 55, the feet of the stripper fingers will be caused to travel toward the outer end of the mandrel at a desired point for discharging said completed pompon in the rotation of the head. The mandrels 41, as shown, are preferably slightly tapered so as to facilitate stripping the finished pompon and also for the purpose of forming the tubular shank of a completed pompon C as shown in Fig. 16, slightly flared, whereby the said article can be readily inserted upon the bone of a chop or other article.

It should be understood that while we have shown and described a spring-controlled device for locking the first fold of the blank to the mandrel that we may, without departing from the spirit of our invention, employ any simple form of vacuum device for accomplishing the same result.

From the foregoing description it is apparent that with each cycle of the machine a series of finished pompons such as shown in Fig. 16 of the drawings are discharged therefrom, the same being formed from blanks B such as shown in Fig. 15. In the operation the paper strip traveling under the slitting rolls is perforated or serrated as shown adjacent to one edge and a line of glue $z$ is discharged upon the surface, as indicated in Figs. 2 and 15. The strip thereafter travels through the forming plate 19 and its serrated or slit edge is folded upon itself to form a seam which is thereafter secured by adhesion of the faces of the folded strip incidental to the latter being passed between the feed-rollers 4 and 4′. The serrated and folded outer edge in its travel to the mandrels is not creased or broken due to the fact that at this point the feed rollers have no contact therewith. After the folded strip has passed under the first set of feed-rollers it is cut into a blank in the form shown in Fig. 15 with the exception that when this cutting operation takes place the serrated edge is folded and sealed. The cutting knife section 21′ forms an oblique edge $x$ as shown in Fig. 15, the angle of this edge being at approximately a right angle to the axis of a mandrel upon which the blank is to be wound. Incidental to a cutting operation to sever the blank section a spot of adhesive material $y$ is deposited upon the corner of the blank adjacent to its oblique edge and thereafter the blank is fed to the mandrel by engagement with the feed-rollers 5, 5′, 6, 6′, the feed-roller 6 being provided with a groove 6″ so as to clear the glue-spot $y$. The forward edge of the blank will now pass between the mandrel and presser-foot, assuming the position shown in Fig. 13 and co-incident to this movement the gripping finger will be released due to its cam-control. Hence said gripping finger will lock or secure the forward edge of the blank to the mandrel and said mandrel will then describe a planetary movement about the axis of the head 32. Co-incident to release of the gripping finger it is apparent that the presser-foot will engage the mandrel and thus as said mandrel is rotated tension upon the strip will result. Should the mandrel in its planetary movement take up the strip faster than it is discharged by the feed-rollers 6 and 6′, provision is made to permit slippage of the feed-roller 6 to thus compensate for the differential movement, the said provision being in the form of a tension spring 9′, whereby the roller is held against normal rotation upon its spindle. Owing to the angular position that the mandrel assumes with relation to its initial engagement with the blank it is apparent that when said mandrel revolves that the blank will be coiled thereabout spirally and in performing the last winding of the coil the edge of the same will be wound straight with relation to said mandrel owing to the oblique cut $x$ in the rear edge at the corner of which the adhesive had been previously deposited. When the last coil has been completed this adhesive deposit will come to rest between the presser-foot and face of the mandrel and in this position it will be held due to the fact that the pinion of said mandrel has now passed beyond the toothed rack with its shoe portion in sliding engagement with the track 44. It is also apparent that prior to the completion of the pompon just described the mandrel following has come to the position of feed and taken up a blank. The completed pompon is not discharged from its mandrel until just prior to said mandrel being placed in position for gripping a second blank, the said stripping being effected by the angular section of the cam-track 55, which section will cause the stripping mechanism to move toward the discharge end of the mandrel and thus force the completed pompon therefrom. Just prior to stripping of the pompon shank from the mandrel the arms 48, 48′, of the spring-controlled lever will be actuated through engagement of arm 48″ of said lever with a rise in the cam-track 49′, said operation causing the presser-foot and gripping finger to release the shank of the pompon in order that the stripping mechanism may perform its function.

It will be observed that owing to the fact that there are four mandrels upon the head that there are four distinct intermittent movements thereof and hence in order to insure alinement of a mandrel with the feed-rollers we provide a spring-shoe 56 which is carried by the shell 29 and is adapted to engage flattened faces of the spindle 31. Hence it is apparent that with each revolution of the head a complete pompon is formed and that there is sufficient delay between the completion of the pompons and their discharge to permit setting of the final sealing connection between the last and adjacent coils. It is also apparent that in some instances in place of winding the pompons upon permanent mandrels we may substitute for the working end of such mandrels removable stems upon which the shanks of the pompons may be coiled and permanently glued thereon.

We claim:

1. A machine for forming tubular ornaments comprising a strip, means for feeding the strip, means for slitting said strip adjacent to its edge, means for folding and sealing the slit edge, means for cutting the folded and sealed strip into sections, a mandrel for coiling the sections, and means for securing the last coil of the section, whereby the ornament is completed.

2. A machine for forming pompons from a blank having a row of serrations adjacent to one edge comprising a rotary mandrel disposed in oblique relation to the path of feed of the blank, means for loosely folding the serrated edge of the blank upon itself, means for adhesively securing the folded edge to the body of said blank clear of its serrations, means for feeding the folded edge blank to the mandrel, blank-gripping means carried by the mandrel for engaging the forward end of said blank, means for rotating the mandrel whereby the blank is spirally wound thereon to expose the serrated end windings of said blank, and means for adhesively securing the last fold of the blank to the preceding fold.

3. A machine for forming paper pompons from a blank having a row of serrations adjacent to one edge comprising means for loosely folding the serrated edge of the blank upon itself, means for adhesively securing the folded edge clear of the serrations, means for feeding the edge folded blank, a rotary receiving mandrel for the blank, the said blank and mandrel being obliquely disposed with relation to each other, whereby the aforesaid blank is spirally wound to expose the serrated edge in a series of coils, and means for adhesively securing the last coil of the blank to the preceding coil.

In testimony that we claim the foregoing we have hereunto set our hands at Milwaukee in the county of Milwaukee and State of Wisconsin in the presence of two witnesses.

ALFRED HARVEY.
HAROLD C. HARVEY.

Witnesses:
 GEO. W. YOUNG,
 M. E. DOWNEY.

Copies of this patent may be obtained for five cents each, by addressing the "Commissioner of Patents, Washington, D. C."